United States Patent
Hofbeck et al.

(10) Patent No.: US 7,624,834 B2
(45) Date of Patent: Dec. 1, 2009

(54) SYSTEM AND METHOD FOR IDENTIFYING SEAT OCCUPANCY IN A VEHICLE

(75) Inventors: Klaus Hofbeck, Neumarkt (DE);
Thomas Klement, Regensburg (DE);
Birgit Rösel, Regensburg (DE); Arnd Stielow, Regensburg (DE); Michael Stippler, Schwandorf (DE)

(73) Assignee: Siemens Aktiengesellschaft, Munich (DE)

( * ) Notice: Subject to any disclaimer, the term of this patent is extended or adjusted under 35 U.S.C. 154(b) by 363 days.

(21) Appl. No.: 10/550,497

(22) PCT Filed: Jan. 29, 2004

(86) PCT No.: PCT/EP2004/000808
§ 371 (c)(1),
(2), (4) Date: Sep. 21, 2005

(87) PCT Pub. No.: WO2004/083004
PCT Pub. Date: Sep. 30, 2004

(65) Prior Publication Data
US 2006/0180377 A1    Aug. 17, 2006

(30) Foreign Application Priority Data
Mar. 21, 2003    (DE) ................. 103 12 740

(51) Int. Cl.
*B60R 21/015*    (2006.01)
(52) U.S. Cl. .................. 180/271; 280/735; 340/457
(58) Field of Classification Search ............. 180/271, 180/268, 273; 280/735; 340/426, 457, 426.26
See application file for complete search history.

(56) References Cited

U.S. PATENT DOCUMENTS

| | | | |
|---|---|---|---|
| 4,700,974 A * | 10/1987 | Andres et al. ............... | 280/806 |
| 5,330,226 A | 7/1994 | Gentry et al. | |
| 5,602,425 A | 2/1997 | Wilhelmi et al. | |
| 6,099,030 A | 8/2000 | Kraft | |
| 6,142,513 A | 11/2000 | Schoos et al. | |
| 6,199,903 B1 | 3/2001 | Brambilla et al. | |
| 6,199,904 B1 | 3/2001 | Dosdall | |
| 6,313,739 B1 | 11/2001 | Roth et al. | |
| 6,462,701 B1 | 10/2002 | Finn | |
| 6,620,999 B2 * | 9/2003 | Pommerenke et al. ...... | 174/384 |
| 6,820,897 B2 * | 11/2004 | Breed et al. ................. | 280/735 |
| 6,946,949 B2 | 9/2005 | Heide et al. | |
| 2002/0008615 A1 | 1/2002 | Heide et al. | |

(Continued)

FOREIGN PATENT DOCUMENTS

DE    43 41 500 A1    6/1994

(Continued)

*Primary Examiner*—Paul N. Dickson
*Assistant Examiner*—Nicole Verley
(74) *Attorney, Agent, or Firm*—Laurence A. Greenberg; Werner H. Stemer; Ralph E. Locher

(57) ABSTRACT

A single high-frequency transmitter emits radiation in a vehicle (1) comprising several seats (2), said high-frequency radiation being reflected depending on whether a seat is occupied, transmitted to a receiver and evaluated with regard to the radiation intensity. In addition, the reliability of the identification is increased, even when the occupant is out of position, by the provision of at least one reflector (9) per seat in or on an allocated seat-belt (6).

21 Claims, 4 Drawing Sheets

U.S. PATENT DOCUMENTS

| | | |
|---|---|---|
| 2002/0140215 A1 * | 10/2002 | Breed et al. .................. 280/735 |
| 2003/0038719 A1 | 2/2003 | Mattes et al. |
| 2004/0245035 A1 | 12/2004 | Hofbeck et al. |
| 2005/0280556 A1 | 12/2005 | Hofbeck et al. |
| 2005/0285736 A1 | 12/2005 | Hofbeck et al. |

FOREIGN PATENT DOCUMENTS

| | | |
|---|---|---|
| DE | 43 39 113 A1 | 5/1995 |
| DE | 44 17 710 A1 | 9/1995 |
| DE | 196 37 108 A1 | 3/1998 |
| DE | 197 39 753 C2 | 8/1999 |
| DE | 199 08 165 A1 | 8/2000 |
| DE | 199 57 536 A1 | 6/2001 |
| DE | 199 57 557 A1 | 6/2001 |
| DE | 100 18 652 A1 | 12/2001 |
| DE | 102 54 197 A1 | 6/2004 |
| DE | 102 54 198 A1 | 6/2004 |
| DE | 102 54 200 A1 | 6/2004 |
| DE | 102 54 201 A1 | 6/2004 |
| DE | 102 54 202 A1 | 6/2004 |
| EP | 1 031 476 A1 | 8/2000 |
| JP | 11-510764 | 9/1999 |
| JP | 2003072441 A | 3/2003 |
| WO | 97/06041 | 2/1997 |

* cited by examiner

SYSTEM AND METHOD FOR IDENTIFYING SEAT OCCUPANCY IN A VEHICLE

BACKGROUND OF THE INVENTION

Field of the Invention

The present invention relates to a method and a system for identifying seat occupancy in a vehicle in which high-frequency radiation is emitted to a seat and the high-frequency radiation is transmitted to a receiver as a function of occupancy and evaluated in respect of radiation intensity.

Such a device for identifying seat occupancy, in which a high-frequency transmitter emits high-frequency radiation to a seat to monitored in respect of seat occupancy, the seat having a reflective surface, is known for example from the patent document U.S. Pat. No. 6,199,904 B1. When said seat is in the unoccupied state, the high-frequency radiation is reflected by the surface and transmitted to a receiver. The received reflected radiation is evaluated in respect of radiation intensity in the receiver. If a person is sitting on said seat, the rays are attenuated to such a degree by the body of the person that the occupancy of said seat can be identified in each instance from the clear reduction in the intensity of the reflected signal sent back to the receiver.

It was proposed internally that transceiver systems should be used as the high-frequency transmit and receive units in a seat occupancy monitoring system, as they are known to be used already in access control and vehicle start systems in motor vehicles. As background to the deployment of high-frequency transceiver systems for an anti-theft system in a motor vehicle, see for example the disclosure of the unpublished German patent application DE 199 57 536 A1. With such devices it is possible to determine the distance between the transceiver and the respective reflector from the delay time of the signals. It is then possible to use said knowledge of the location and position of the seat in question to distinguish the signals reflected by the respective reflector from other stray signals in the environment, so that it can be reliably determined from the intensity of the received signals if a person is sitting on a seat.

It was also proposed internally that so-called backscatter systems should be used as reflectors, preferably for deployment with more than one seat in a vehicle, as with these the reflected signals are modulated with a fixed code that can be adjusted individually. Such modulating backscatter systems are for example known from the unpublished German patent application DE 199 57 557 A1 for deployment in a motor vehicle identification system. The backscatter systems thereby comprise surface wave elements with reflectors providing internally variable modulation. A backscatter system provides a received signal with an adjustable code so that a back signal thus converted can be distinguished for example from any reflections of metal parts within a motor vehicle. This allows better evaluation results to be achieved for generally less outlay.

SUMMARY OF THE INVENTION

The object of the present invention is to develop a device and a method for identifying seat occupancy whilst reducing the equipment outlay in each instance.

A device according to the invention therefore has only one transmit unit to supply a wave field to determine occupancy of a respective seat in a vehicle with a plurality of seats to be monitored. This measure creates an easily scalable system for monitoring the occupancy of a plurality of seats. The respective high-frequency transmission capacity is thereby only slightly increased. Also the additional cost of electronic devices for activation and evaluation purposes does not increase in a linear fashion with the number of seats to be monitored. The space requirement and production costs do not therefore increase in a linear fashion with the number of seats. The power input required to conserve the limited energy reserves available particularly in a motor vehicle is also reduced.

An approach according to the invention can also advantageously be applied to the systems and methods already proposed by the applicant as described below:

Based on the use of backscatter systems as reflectors as described above, in DE 102 54 197 the applicant disclosed a system and a method for identifying seat occupancy in a motor vehicle, in which it is proposed that seats are distinguished on the basis of differently modulated or coded signal backscatter using backscatter systems in the respective seats. This is also possible using a single transmit and receive unit.

It was proposed by the company in the context of DE 102 54 198 that occupancy of seats in a motor vehicle be tested based on specific diffraction patterns using the diffraction phenomena that occur to a significant degree with high-frequency electromagnetic radiation.

It was also proposed internally in DE 102 54 202 that the occupancy of seats in a motor vehicle be detected by sequential measurement of the intensity of the respective backscatter during the temporary switching on and off of reflector elements at the respective seats. This would for example allow only the backscatter of one seat to be evaluated in each instance using a transmit and receive unit in the form of a transceiver. Progressive switching of the reflector elements over time would then allow an occupancy state to be detected in a vehicle.

Alternatively it is possible to displace the beam of a main lobe of the wave field emitted by the transmitter. This is preferably achieved electronically, as known from airfield monitoring systems as aspects of radar technology.

Known and published devices for identifying the position of a person on a seat of a motor vehicle in particular have the disadvantage that it cannot be identified or it cannot be identified with sufficient accuracy whether a person is sitting on the vehicle seat or whether they are just leaning forward or resting obliquely on the seat. Only the intensity of the received signals is evaluated, in other words only the attenuation as the human body passes once or twice through the electromagnetic radiation is used. To resolve this problem, a method for measuring the intensity of high-frequency radiation scattered back by a plurality of reflectors for each seat was disclosed internally and without prior publication in DE 102 54 200 specifically to identify a so-called out of position situation. The particular feature of such a device is that the reflectors are arranged as individual elements distributed locally on a seat, such that reflectors that were previously covered in a normal sitting position are increasingly uncovered as the person sitting on the relevant seat progressively leans forward, causing the intensity of the electromagnetic signal reflected overall to increase significantly.

In the context of the patent application proposed internally and submitted under application number DE 102 54 201, an intensity measurement of electromagnetic radiation reflected by a plurality of reflectors on a respective seat is also proposed as a device and method for identifying the position of a person on a seat of a motor vehicle. The reflectors are thereby also arranged at the edges of the seat and are distributed outside the area covered by a person such that in addition to the type of position identification or sitting position of a person sitting on a seat as described above, it is also possible to carry out a diagnosis or self-test of the system as a whole. It is thereby proposed that the diagnosis reflectors arranged at the edges outside the actual area covered should also be reflectors that can be switched on and off.

For better identification of the position of a person on a seat in a motor vehicle, it is also proposed that at least one reflector per seat be arranged in or on an associated seatbelt. This arrangement of the at least one reflector per seatbelt is thereby selected such that when the seatbelt is fastened, the at least one reflector is moved into a position in a wave field emitted by the high-frequency transmitter, in that it receives and therefore transmits back significantly more electromagnetic high-frequency energy than it would with the seatbelt in an unfastened, passive position. The respective reflector therefore essentially only enters the field of vision of a transmit and receive unit operating at high frequency, when a person or object is secured by the seatbelt on a seat in a motor vehicle.

Measurements taken in this respect, as described in more detail below with reference to an exemplary embodiment of the present invention, show a difference in intensity of several decades between the quantities of high-frequency electromagnetic energy reflected by the reflector in the passive and active states of the seatbelt.

As the belt, and therefore also the reflectors themselves remain within the wave field in an out of position situation, this specific instance of occupancy can be identified with a greater degree of reliability in a device according to the invention. A system already present in a motor vehicle is thereby advantageously also used, so that any additional outlay essentially relates to the attachment of additional reflectors in or on the respective seatbelt and a functional extension of the evaluation of the received signals.

In a development of the invention, the seatbelt and therefore at least one reflector are moved into an essentially electromagnetically screened area in the unfastened passive position. To this end the seatbelt is preferably retracted in the known manner, with the stowage space of the retraction mechanism being electromagnetically screened by a metal coating.

In different embodiments of the invention a respectively reflected signal is tested in respect of its intensity and/or the respective signal delay time in the evaluation device. The test on the respective intensity of the reflected signal provides a clearly evaluatable distinction criterion for whether a seatbelt is fastened to protect a person or an object on a seat. The distance between the respective seatbelt and the backrest of a respective seat can be measured using delay time differences. A distinction can also be made in the evaluation unit between a larger passenger and an out of position situation on this basis depending on the pattern.

In a particularly advantageous embodiment of the invention a method according to the invention is deployed in combination with the method proposed essentially by the company and described above. One reflected signal originating both from at least one reflector in the area of the seatbelt and a plurality of reflectors distributed as described above over the surface of a seat is thereby evaluated overall. The reflected electromagnetically high-frequency signals from the reflectors of these two essentially different types of arrangement can advantageously be distinguished through the use of backscatter systems. The occupancy of a respective seat is thereby determined in a redundant fashion, with an out of position situation also being detected particularly advantageously by measurement in a significantly improved and more reliable fashion. While reflectors arranged behind a person, for example in the area of a backrest, are increasingly uncovered when the person leans forward from a normal sitting position in their seat and could simulate a seat that might not be or is not definitely occupied, the at least one reflector on the seatbelt still reliably indicates occupancy of said seat. As the person leans forward on the seat, the belt and therefore also the at least one reflector attached thereto is moved further from the backrest of the relevant seat towards the transmit and receive unit. This change in position can be detected as part of the distance measurement as an additional indicator of an out of position situation, as already described in a different-context.

A combined solution can however also mean that a belt fastening sensor beings about isolation to activate semi-active or active reflectors on a seat. Fastening the belt can also serve to establish an electrical contact via the belt fastening itself. Semi-active or active reflectors can thereby be arranged in the seat and/or in the belt itself.

A system is therefore generally described above, in which a high-frequency electromagnetic wave field is preferably generated within a passenger cell of a motor vehicle using only one transmit unit. The wave field covers a space containing all permitted seats and/or stowage areas in a motor vehicle to be occupied by people and/or loads. These seats are correspondingly equipped with one or a plurality of the Human Observation By Beam Interference Technology or HOBBIT methods with corresponding HOBBIT reflectors as mentioned above and disclosed by the company, to identify occupancy of a respective seat. A respective type of occupancy can also be identified reliably in the manner described above, it being possible to distinguish, in addition to an out of position situation, whether a tall adult, a light and small person, such as a child, or a baby in a reclining seat, or even a load, e.g. in the form of luggage, etc. is on a seat.

As well as delay time measurements, level measurements are primarily also taken on the frequencies of the various back or reflection signals from the reflectors. Such measuring methods are very fast due to the simplicity of the evaluations to be carried out. Dynamic measurement is therefore also possible. Occupancy of a respective seat and position may therefore only be determined from the time of impact in the event of an accident. The trigger for such a measurement can be an early warning signal, activated for example by a pre-crash sensor on the outside of a vehicle in the event of excessive negative acceleration or incipient deformation. Radar distance sensors or other accident early warning systems can also operate as signal emitters.

Activation as described above for a dynamic measurement also allows the load on the vehicle occupants due to microwave radiation to be reduced to a minimum by switching the system radiation output at intervals. The proposed occupancy measurement is concentrated on a risk situation, which is assumed on the basis of pre-crash sensors. But the radiation output remains comparatively low even in situations where the lives of the vehicle occupants may be endangered:

A standard mobile telephone emits approx. 1000 mW at around 1.8 GHz during a call;

A cordless fixed network telephone according to the DECT standard is always active with 250 mW at 1.9 GHz (even when no call is being made) and Bluetooth components emit approx. 100 mW active output at 2.4 GHz depending on the respective operating mode.

The sensor output required in the context of the present invention at 2.4 GHz is <1 mW. This output is only emitted, if one or a plurality of mutually independent indicators assumes an accident situation.

The time required to measure for seat occupancy is only a few milliseconds. These measuring times are therefore sufficiently short compared with the overall time of the course of an accident. These very short measuring times mean that it is possible to achieve a specific dynamic by controlling an airbag for a seat that is also actually occupied, said dynamic being adjusted as a function of the respective sitting position or inclination of a person, their height and/or weight. After ignition of an airbag, the dynamic is preferably influenced by a specific pressure reduction.

Activation of a belt tensioner can also be used on the basis of the results of a dynamic measurement for occupancy of a respective seat to reduce risk effectively in the event of an accident. The fact that a seatbelt is holding a person firmly in an accident situation is very important. Tests have shown that a seatbelt with belt tensioners provides approximately 90% safety. The value of a front passenger airbag in contrast is significantly lower. As described above for the airbag, the intelligence of the functionality of the belt tensioner can be increased by information about a person belted in and leaning forward. In the event of an accident the belt tensioner can implement a multistage response with the distance information and inclination of the passenger as sensor data based on dynamic measurement of occupancy of the respective seat. When determining the difference in safety between an efficiently belted person and a poorly belted person in an accident, it was established that as little as approximately 3 cm excess belt length can cause the level of safety to deteriorate significantly and the risk of injury to increase significantly.

The measurement and subsequent setting operation can take the form of headrest adjustment even outside an accident situation. Activation of a motor-adjustable headrest or height regulation based on size estimations from the signal evaluation from seat monitoring can only be used effectively as a measure to prevent whiplash and neck and spinal column syndromes in the event of road traffic accidents. It can however be deemed to be of lesser importance as a purely comfort feature due to the associated additional cost.

Various application options are possible for such a system using the output signals output by an evaluation unit:
a. Activation or trigger for comfort applications in a vehicle
b. Activation for ease of operation after a passive access control and start system or passive start and entry approach or PASE
c. Information source for safety applications.

Further advantageous embodiments are the subject matter of the respective subclaims.

The present invention is described in more detail below to illustrate further features and advantages based on preferred exemplary embodiments with reference to the attached drawing, in which:

DESCRIPTION OF THE PREFERRED EMBODIMENTS

Figure 1:
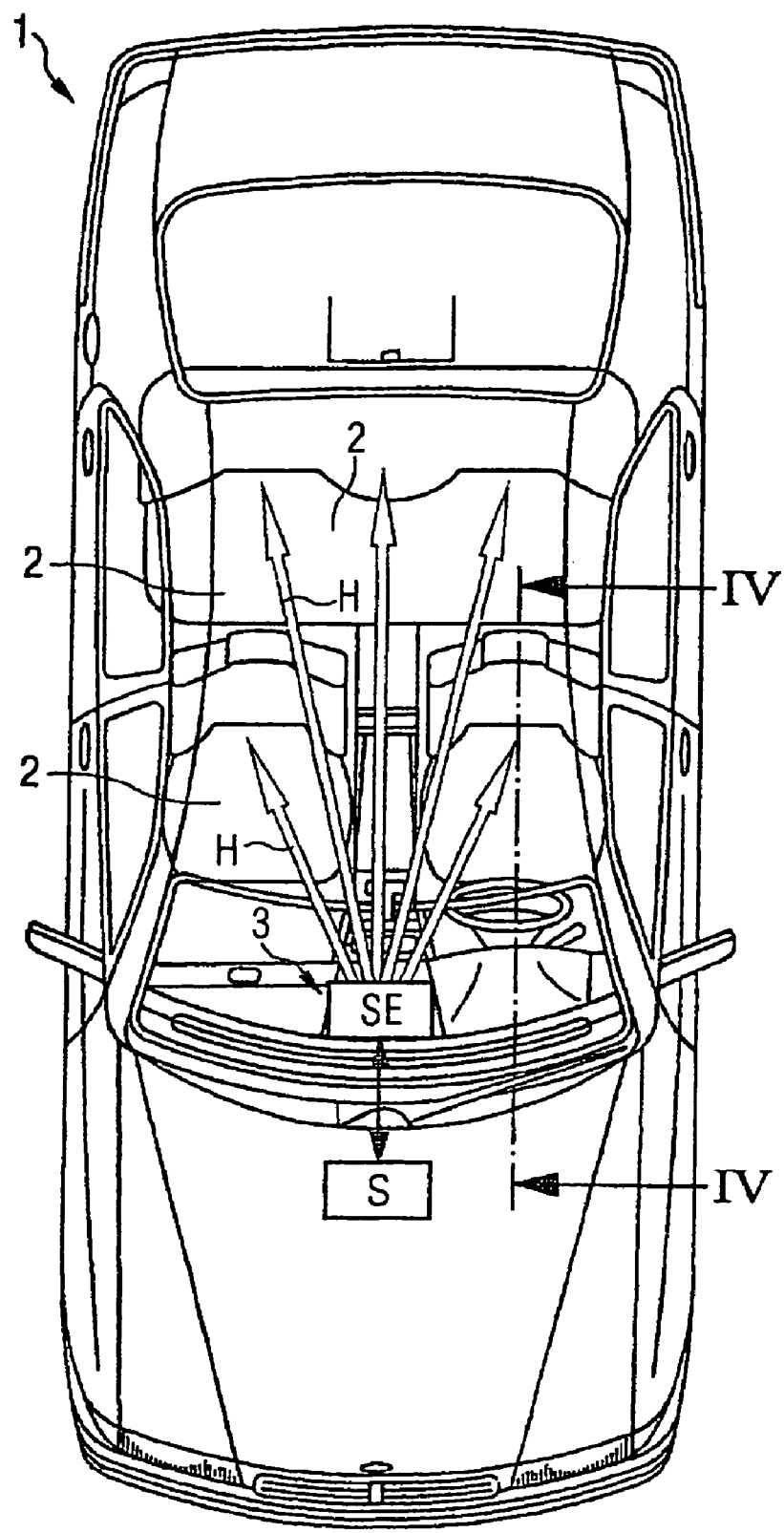
FIG. 1 shows a schematic illustration of an occupancy monitoring system in a motor vehicle with 5 seats.

A motor vehicle 1 with five seats 2 is shown schematically in FIG. 1. According to the description of the prior art above, each seat would be covered by an independent identification system 3 for each of the seats 2 with a control unit S, a transmit and receive unit SE and a radiation field H emitted by this to detect seat occupancy. In contrast an identification system 3 according to the invention is provided here, in which all the seats 2 are covered by the wave field H from one transmit unit.

By deploying one of the methods for identifying seat occupancy described in brief above and hitherto only proposed by the company, the use of backscatter reflectors would reduce the equipment outlay for the transmit and receive units SE. By coding the respective backscatter signals of each seat 2 in a different and distinguishable manner, it is possible to use just one high-frequency wave field for detection purposes, for example according to the doctrine of U.S. Pat. No. 6,199,903 B1.

Known devices have significant disadvantages in respect of reliability when identifying seat occupancy, in particular in a so-called out of position situation. The person skilled in the art refers to an out of position situation, when a person is on a vehicle seat 2 but is leaning forward significantly or in a sitting position that is extremely oblique to a normal sitting position. As a result with the known method for demonstrating seat occupancy, significantly more high-frequency energy from the radiation field is reflected back to a receive unit by the increased uncovering of at least one reflector than would occur in the case of normal occupancy. In unfavorable instances this can mean that a seat that is actually occupied is erroneously evaluated as unoccupied by a system 3.

An equally serious problem arises when known seat occupancy systems 3 are linked to active safety components of a motor vehicle 1, for example on activation of an airbag system. In an out of position situation a person is generally bending too far forward in the seat so that the head-neck-shoulder line moves out of the normal position for a sitting person toward an airbag. Uninfluenced activation of said airbag in the situation described above can represent a life-threatening danger due to the momentum of the impact of the airbag on the parts of the body of the person in an out of position situation. For further details, see the detailed description which follows in relation to FIGS. 4 to 6.

One possible effective remedy for identifying out of position situations is the exemplary embodiment described in more detail below with reference to the diagram in FIG. 2. In the top view outlined in FIG. 2 of the driving seat of a known structure, the contour of a relatively tall adult is marked G and the contour of a relatively small person, for example a child, is marked K. These two persons of very differing stature are sitting on a seat surface 4 of the seat 2, leaning back against the backrest 5. In the situation shown in FIG. 2 both persons are belted in as prescribed by a known seatbelt 6 in the form of a three-point seatbelt with a shoulder belt 7 and a lap belt 8. As shown by the selected diagram of a top view, the positions of the shoulder belt 7 and lap belt 8 in the case of a belted tall person G do not differ from those in the case of a belted small person K.

At least one reflector 9 is now arranged in or on the seatbelt 6 such that it is located in an area 10 covered by the wave field H when the seatbelt 6 is fastened. In the present instance two reflectors 9 are arranged on the shoulder belt 7 and lap belt 8 of the seatbelt 6 respectively, such that they are within the body contour when the seatbelt 6 is fastened, even when a small person K is belted in. Regardless of the stature of a belted person therefore the four reflectors 9 on the seatbelt 6 are always essentially within the area 10 covered by the wave field H, so that in the active position described above with the seatbelt 6 fastened a backscatter signal generated by the reflectors 9 is detected at a very high level in the receive unit.

Figure 2:
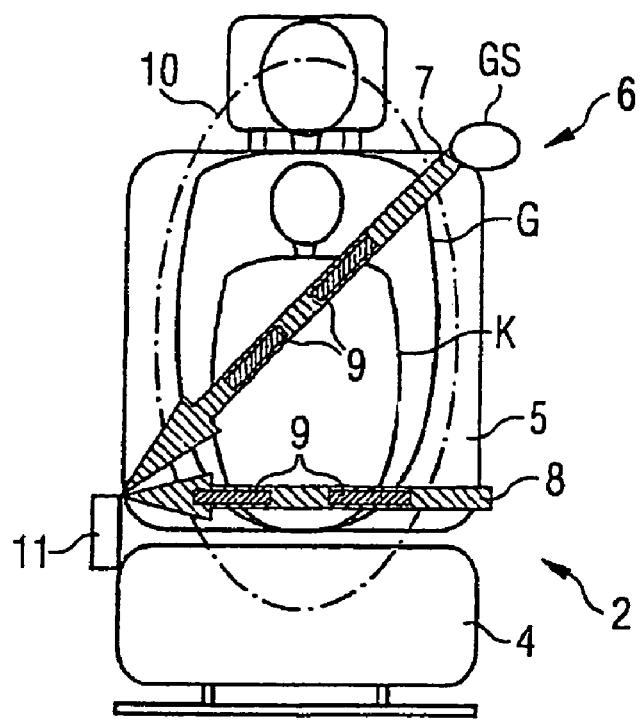
FIG. 2 shows an outline of a top view of the driving seat in FIG. 1 for different types of occupation by a belted person.
Figure 3:
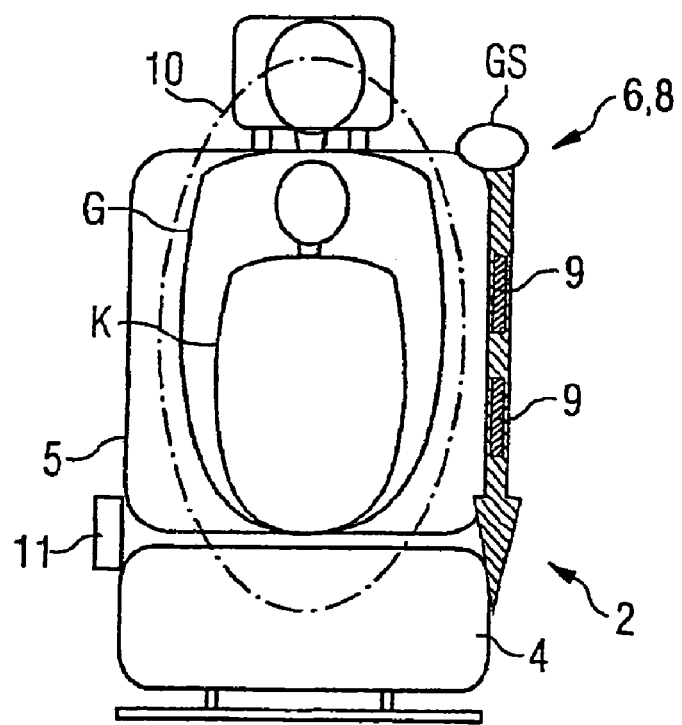
FIG. 3 shows the view in FIG. 2 with the seatbelt system in a passive position.

As in the diagram in FIG. 2, in FIG. 3 the seat 2 is shown in outline with a large person G not belted in and a small person K also not belted in. In this instance the seatbelt 6 is retracted by a belt tensioner GS at an outer edge of the backrest 5 of the seat 2. The reflectors 9 attached in the belt 6 are therefore also removed from the area 10 covered by the wave field H to the extent that only a very small proportion of the electromagnetic radiation is reflected. The belt tensioner GS has retracted the shoulder belt 7 with two reflectors 9 into it. As it is electromagnetically screened, no further backscatter signal can be emitted by the two reflectors 9 on the shoulder belt 7. Even without the beam formation shown in the form of a main lobe, a significant decrease can be measured in the intensity of an overall backscatter signal, as now only two reflectors 9 on the lap belt can reflect. Therefore given the generally applicable requirement that a seatbelt should be worn, it is possible to identify occupancy of a seat 2 with a very high level of reliability according to the identification system 3 described above.

When using semi-active or active reflectors 9 it is possible to activate them by establishing an electrical contact by means of a belt fastener 11. As a result the reflectors 9 only become generally active when supplied with electrical energy when the seatbelt 6 is reliably locked.

Figure 4:
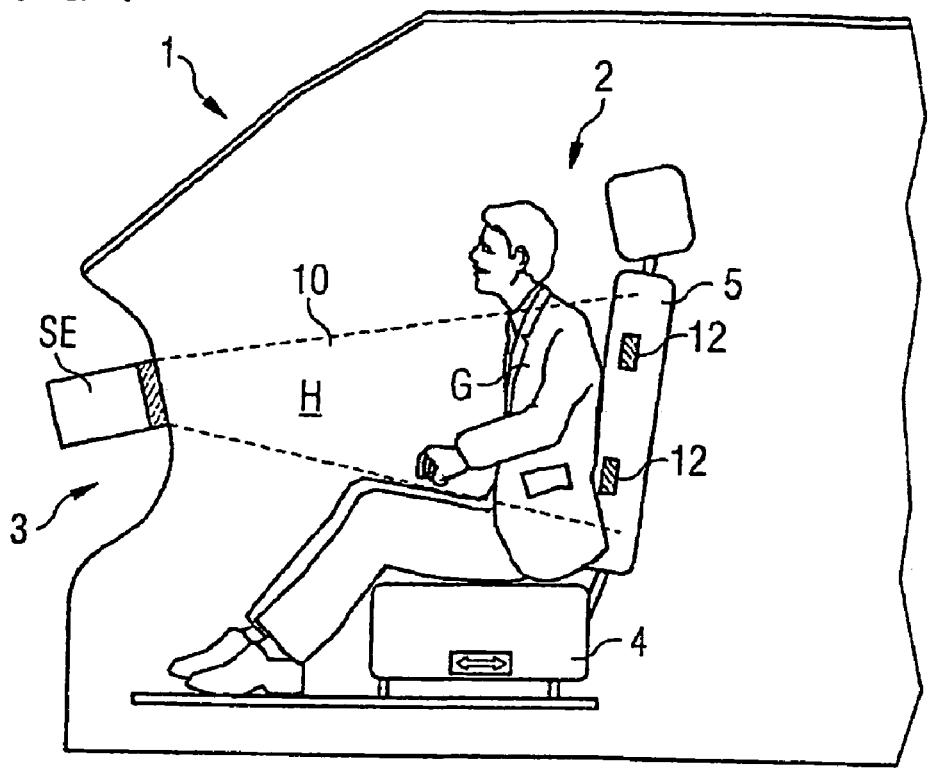
FIG. 4 shows a diagram of a lateral section of the driving seat position in FIG. 1.

The diagram in FIG. 4 shows a lateral cross-section of the position of the driving seat 2 in FIG. 1 by way of an example. An identification device for seat occupancy in a vehicle 1, as proposed by the company in DE 102 54 202, is described with reference to this diagram. In this instance a plurality of reflectors 12 are distributed in the backrest 5 of the seat 2 such that the reflectors 12 shown are covered by the body of a person of tall stature G in a normal sitting position to the extent that the electromagnetic radiation from the wave field H emitted by the transmit device SE is essentially attenuated in the area covered 10.

With the person in the relaxed position shown, the high-frequency electromagnetic radiation therefore passes through the body of the person a second time after reflection off the reflectors 12. This further attenuates the electromagnetic radiation very significantly such that the receive unit in the transmit and receive unit SE generally only receives a very significantly attenuated electromagnetic signal reflected back from the seat 2 shown. Occupancy is identified on this basis.

Parallel to this measurement seats can be distinguished in a fashion not shown in further graphic detail using modulated, coded or otherwise distinguishable backscatter from the electromagnetic radiation. To this end, according to the internal doctrine within the company from the unpublished DE 102 54 197, backscatter reflector elements 12 are arranged in the seat 2. If these reflectors 12 are conFig. d wholly or partially such that they can be switched on and off, it is also possible to detect occupancy by switching the reflectors 12 on and off at the respective seats and/or to carry out a type of self-test on the identification system 3. It is also possible to carry out an extended occupancy test with reference to diffraction patterns to distinguish between occupancy by adults, children or babies, etc., based on an evaluation of diffraction phenomena that occur to a significant degree with high-frequency electromagnetic radiation, as set out above in the description with reference to internal company proposals.

Figure 5:
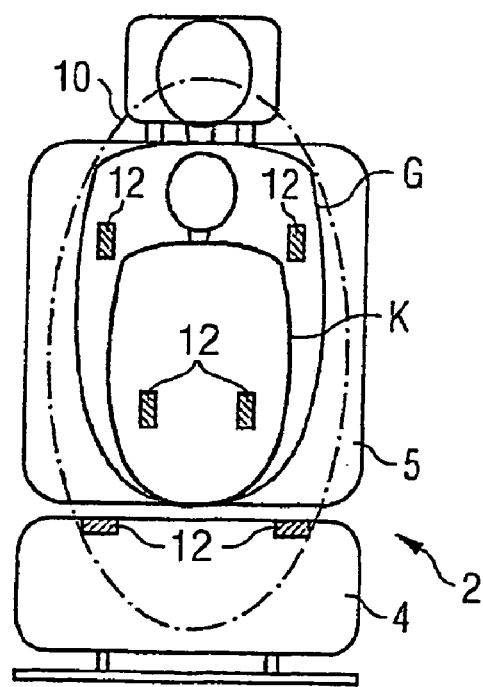
FIG. 5 shows a top view of the seat in FIG. 4 with reflectors in the seat.

Like the diagrams in FIGS. 2 and 3, FIG. 5 shows a top view of a seat 2 fitted with six reflectors 12 in the seat surface 4 and backrest 5 as described above. Assuming an area of coverage by a high-frequency wave field H, the body contours G, K of a tall and a small person are outlined in relation to the position of the reflectors 12. An arrangement according to the doctrine of DE 102 54 200 has therefore been created using locally distributed reflectors.

As a person G sitting on the seat 2 continues to bend forward out of a relaxed sitting position, the reflectors 12 of the seat 2 in FIG. 5 are progressively uncovered by the body of said person G. An intensity distribution detected by the transmit and receive unit SE in an arrangement on the motor vehicle 1 shown by way of an example in FIG. 4 is plotted for the respective angle of inclination of the upper body of the person in the diagram in FIG. 6.

Figure 6:
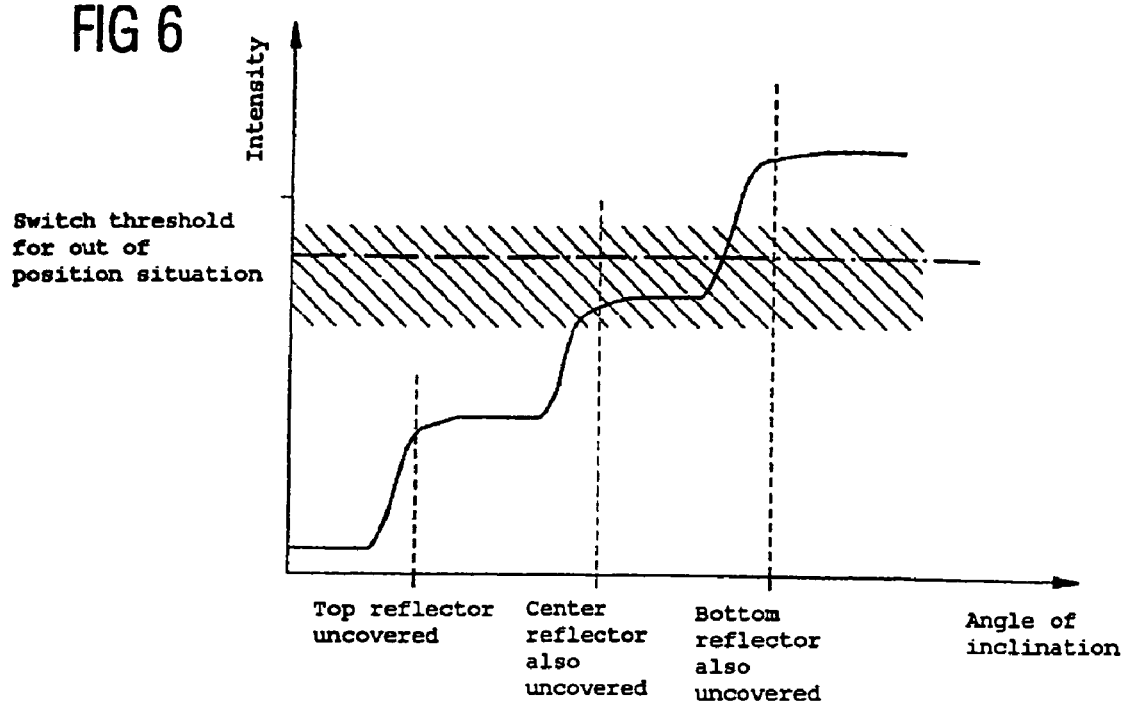
FIG. 6 shows a diagrammatic representation of an intensity distribution.

In the diagram in FIG. 6 a switch threshold is shown with a broken line. This switch threshold is used to define the distinction between a still tolerable sitting position compared with an out of position situation. Multiple reflections and other intensity fluctuations however result in the area shown shaded in the diagram in FIG. 6 in a larger degree of fluctuation of the intensity values. Assuming deployment of a basic design of a device according to the doctrine of DE 102 54 200 with simple reflectors 12, which are in particular not configured as modulated backscatter reflectors, measurement in an out of position situation becomes unclear compared with the demonstration of occupancy of the seat 2 by a person with a slightly inclined upper body.

Figure 7:
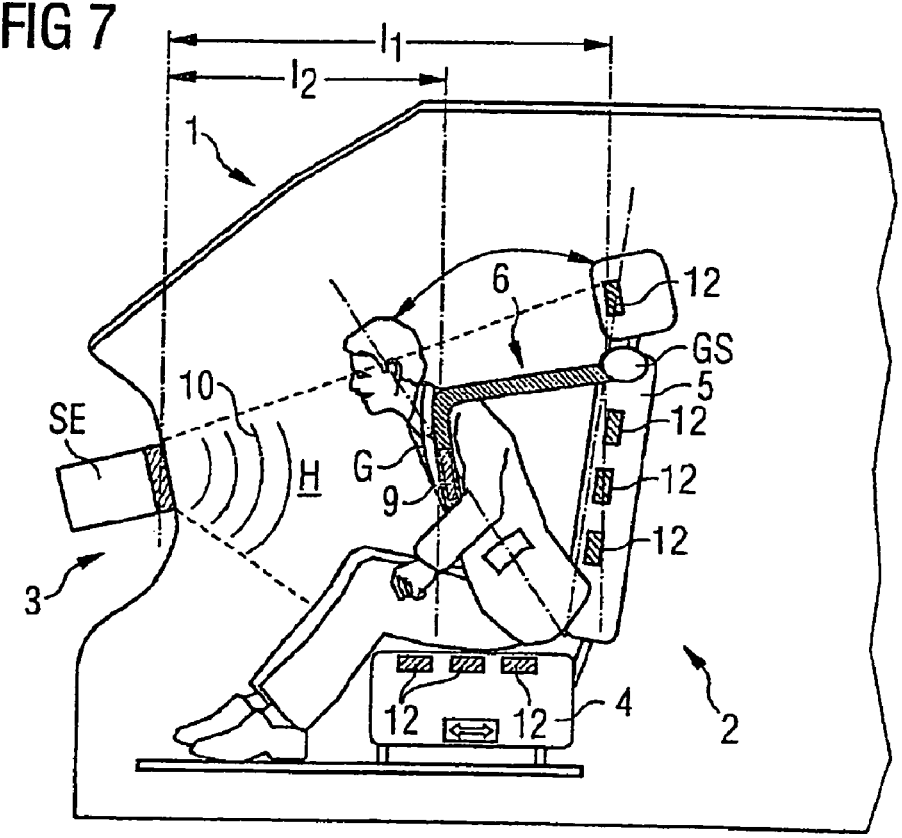
FIG. 7 shows an outline of an out of position situation with improved detection.

Advantageously these identification methods already proposed can however be combined with an inventive identification method described with reference to the diagrams in FIGS. 2 and 3, as outlined in the exemplary embodiment in FIG. 7 in a diagram like the one in FIG. 4. FIG. 7 shows a graphic illustration of an out of position situation, in which a tall person is sitting on the seat 2, with their body inclined at a significant angle compared with a normal sitting position. The four reflectors 12 shown in the backrest and headrest by way of an example in the diagram in FIG. 7 are uncovered in this sitting position to such a degree that the radiation field H will generate back signals of higher intensity due to direct access and/or diffraction effects via the reflectors 12. Three reflectors 12 in the seat surface 4 remain covered and the seat 2 is therefore correctly occupied. The simultaneous detection of a second reflection that can be distinguished from the first-mentioned reflection and is produced by reflectors 9 on the seatbelt 6, means that seat occupancy in an out of position situation can be clearly determined. The angle of inclination of the upper body of the person can also be estimated from the transmit and receive unit SE via the reflectors 9 on the seatbelt 6. This is done by means of a combined intensity and signal delay time measurement: Based on a measured signal intensity the belt 6 must be fastened, the belt 6 being at a distance $1_2$ from the transmit and receive unit SE. The seat 2 however is at a distance $1_1$ from the transmit and receive unit SE. A recorded diffraction pattern shows that the person does not fill this difference in distance totally with their body. It is therefore not a very large person. The reliability of the identification of out of position situations is therefore significantly enhanced by the combination of a known or currently only internally proposed method and a method according to the invention.

The same system 3 can also enquire whether a person occupying a seat 2 is belted in. With this proposed solution according to FIG. 7 it is very advantageous that an already available infrastructure is essentially used, for its part already deployed for access control and vehicle start systems in modern motor vehicles 1 as mentioned above. Therefore for deployment of a method according to the invention, either alone or in combination, as set out with reference to FIG. 7 above, only one arrangement of additional reflectors 9 is required on the seatbelt 6 when using existing system components. Also an evaluation unit, integrated in the control unit S in the present exemplary embodiment for example or connected downstream from this, can extend the functions described above.

A novel identification system 3 set out with reference to FIGS. 2 and 3 alone, the identification systems already proposed internally with reference to FIGS. 4 to 6 and a very advantageous combination system according to FIG. 7 all have in common the fact that a high-frequency electromagnetic wave field H is generated very efficiently using just one transmit and receive unit SE, covering all the permitted seats 2 for persons and/or loads for occupancy detection purposes in a motor vehicle as the preferred application. To this end the seats 2 and/or seatbelts 6 are fitted with HOBBIT reflectors 9, 12, which are configured very advantageously according to the disclosure of DE 102 54 201 correspondingly as passive, semi-passive, semi-active or even active modulating backscatter reflectors.

The response of the HOBBIT reflectors 9 is independent of any seat occupancy. The described system deduces, as a function of how many levels of modulated reflection there are from a HOBBIT reflector 9, located on a belt 6 in the wave field H or in a geometric shadow of the person to be detected, the occupancy of the individual seats 2 and the position and shape G, K of the person on the respective seat 2. By modulating the backscatter reflectors 9 it is possible to distinguish between the backscatter of the individual HOBBIT reflectors 9 and therefore the seats 2 to be covered in the transmit and receive unit SE using an evaluation unit (not shown in more detail). There is therefore no need for an electrical connection between the transmit and receive unit SE and the individual HOBBIT reflectors. The HOBBIT reflector also requires no information about the status of the transmit and receive unit SE as the HOBBIT base station and the wave field H.

As the reflectors 9, 12, as so-called HOBBIT reflectors in preferred embodiments of the present invention in the exemplary embodiments shown, are purely passive components based on surface source components for electromagnetic high-frequency applications in the approx. 2.4 GHz or 24 GHz range, they can also be produced with the necessary individualization, as required for example to be able to distinguish between individual seats, in the form of film elements both flexibly and economically in large-scale processes. Modern weaving technology thereby allows reflectors to be arranged on the material of a seatbelt or the surface material of a seat 2 and to be integrated in the relevant materials. This advantageously allows a mechanically stress-free arrangement with little strain, in particular when wound up by a belt tensioner, in a neutral fiber of the belt material. As well as the option of individualization with limited production costs, it also ensures flexible deployment with a high level of functional reliability and adequate life for such HOBBIT reflectors 9, 12.

It was assumed above that the entire interior of the passenger cell of a motor vehicle 1 is essentially filled in a regular fashion by a wave field from the transmitter. Diffraction and reflection assist coverage. Alternatively, in an exemplary embodiment not shown in more graphical detail, a wave field H in the said frequency ranges is configure d by using so-called dielectric emitters, such that defined main lobes of the wave field H are directed to a seat 2 to be monitored in each instance within the vehicle 1. Based on this particular beam formation here with five radiation lobes for the five seats 2 of a vehicle 1, the radiation characteristics of such an arrangement correspond essentially to the outline in the diagram in FIG. 1. The design of such dielectric emitters, as known from radar technology for example for systems for electronically deflectable airfield monitoring, is generally only numerically possible and relatively expensive due to its high outlay. However when deployed in large numbers this approach is recommended due to the robust structure of the corresponding transmit and receive unit SE and its comparatively rational and therefore generally economical production with a high level of reliability.

Three possible applications for such systems are described below based on three exemplary embodiments not shown in further graphic detail without reference to further graphic diagrams:

In a first application an identification system 3 constructed according to the features described above serves as the activation system for comfort applications in a motor vehicle 1. An identification system 3 thereby operates within a more complex overall system in a manner that is secondary in time to an access control and vehicle start system. This means that in a first step a person approaching the motor vehicle 1 is authorized and identified from a code emitter or customer identification device CID. One of the identification systems 3 described above then powers up a navigation system and corresponding cockpit illumination system once the driving seat is definitively occupied. The process of occupying the seat 2 causes the interior light and/or radio to be switched on according to presettings defined by the respectively identified driver. Once the engine has started, further information is output to the driver, such as primarily the information whether all the people in the vehicle 1 have fastened their belts. Starting the engine has already caused the seat 2 to be adjusted to stored physical data relating to the respective driver and similarly an interior mirror to be aligned and an exterior mirror that was automatically retracted beforehand when the driver left the vehicle 1 to be moved out, again taking into account individual settings for a respectively identified driver. Based on identification of a respectively authorized driver, this dispenses with the need for all the adjustments that currently have to be made manually for safety reasons before starting the engine, which require active adaptation of a respective motor vehicle 1 to the individual circumstances of a driver for safety reasons with an infinite amount of time and/or energy-consuming experimentation. This significantly enhances both the safety of operation of a vehicle 1 and its user-friendliness and comfort.

Alternatively or in addition to the options mentioned above an identification device 3 as described above activates an access control system referred to as a passive start and entry or PASE system. A user accesses a motor vehicle 1 fitted with PASE simply by gripping a door handle or comparable device. No further active action is required, as is currently the case with radio remote controls for example. When leaving a motor vehicle 1 thus equipped, the function for identifying seat occupancy or vacation only allows automatic locking of the vehicle 1, if all the seats 2 within the vehicle are demonstrably unoccupied. Only then is a so-called walk away locking or WAL function activated. The vehicle 1 then automatically starts a search for a customer identification device CID by transmitting electromagnetic request signals at intervals. If an authorized person then approaches the vehicle again, this prepares for opening with distance and position-dependent sub-steps or sub-functions.

In the case of a vehicle equipped solely with PASE, an electronic steering wheel lock ELV is automatically activated via a device as described above for seat occupancy identification when the driving seat is vacated.

In a further embodiment of the invention the following scenario is therefore possible in a motor vehicle fitted with a PASE system, if a customer identification device CID is detected in the vehicle interior and the driving seat is determined as occupied by a device 3. A starter knob light is activated to orient the driver. The drive system starter is enabled, with the positions of the driving seat 2, steering wheel and foot pedals being adjusted as a function of stored presettings based on the identification CID-ID of the customer identification device CID. Finally automatic unlocking of the electronic steering wheel lock ELV is activated.

According to the prior art the above measures can only be carried out to an inadequate degree. The large amount of energy currently required means that occupancy of a respective seat can only be evaluated when the engine is running. The evaluation devices also require very long response times to determine seat occupancy. After the engine has been switched on, it takes up to 14 s for the vehicle to detect seat occupancy status, in order to be able to activate an airbag for example accordingly. Many standard situations, e.g. leaving a parking space at the side of a street and gradually filtering into moving traffic, cannot be detected for the required controlled influencing of an activation response of the airbag, etc.

According to some embodiments of the present invention however an evaluation is carried out with a very small energy requirement taking a matter of milliseconds. In any event the evaluation can also be carried out before the engine is started. An if necessary continuously active seat occupancy identification system can for example be activated when a door is unlocked. The system could then actively observe the seats from the time when a door is opened before the engine is activated. This provides a novel safety feature. The engine start functions and/or steering wheel lock is/are only released if the driving seat is detected as being occupied by an adult and a customer identification device CID is present in the interior demonstrating access and start authorization in a contactless fashion.

Finally an identification system 3 as described above can also be used as an information source for safety applications. In addition to the special measures already addressed with reference to specific safety settings for airbag safety systems in out of position situations, for example on identification of an empty seat, identification of a child or baby as the passenger, a belt tensioner is calibrated for a properly occupied seat and a relaxed sitting position, in which the passenger leans back against the backrest. As already set out in relation to the diagrams in FIGS. 2 and 3, it is possible when using HOBBIT backscatter reflectors 9 in the seatbelt 6 to forward more detailed information about the position and stature of a person sitting on a respective seat 2 to safety-related sub-systems or to provide it for these in a processed fashion. This includes for example the height adjustment of a belt retraction mechanism required as a function of the stature of the person to be protected in each instance.

Based on an access control and authorization enquiry system, as is frequently already present in modern motor vehicles, a highly energy-saving, efficient and reliable system is proposed for identification of the occupancy of seats 2 within a motor vehicle 1 in the context of the exemplary embodiments described above and to some degree also with reference to the Fig. s in the drawing. Significantly more reliable information is provided by slightly extending the already available infrastructure or hardware in the interior of the vehicle 1. By extending the evaluation and analysis capabilities of a transmit and receive unit SE it is possible to use the application options discussed above alternatively or additionally to enhance the safety of persons in the vehicle and for applications relating purely to comfort. The costs of additional hardware are thereby essentially restricted to the attachment of additional reflectors 9 and the control device S, which is however also provided as a component in safety devices of the type mentioned above. Retrofitting can therefore also take the form of the replacement of a standard electronic component.

We claim:

1. A method for identifying seat occupancy in a vehicle, the method which comprises:
   providing a plurality of seats with a plurality of reflectors;
   providing a single transmitter that emits a field of high-frequency radiation towards the plurality of seats such that the plurality of reflectors in the plurality of seats reflect the high-frequency radiation that is emitted from the single transmitter;
   providing a single receiver unit that receives the high-frequency radiation that is reflected by the plurality of reflectors in the plurality of seats; and
   evaluating, in a control unit, the radiation received by the receiver unit with respect to a radiation intensity and deducing therefrom a seat occupancy at the plurality of seats.

2. The method according to claim 1, wherein each of the plurality of seats has at least one reflector assigned thereto that is distinguishable from all other ones of the plurality of reflectors in the plurality of seats.

3. The method according to claim 2, which comprises rendering the reflectors distinguishable by modulated reflection and/or switching the reflectors on and off at time intervals and/or changing a beam direction of the wave field.

4. The method according to claim 1, wherein at least one reflector is disposed in or on an associated seatbelt for each seat and when the belt is fastened, the reflector is moved into a position within a wave field emitted by the high-frequency transmit unit, in which the at least one reflector receives and correspondingly transmits back appreciably more electromagnetic high-frequency energy than when the seatbelt is in an open passive position.

5. The method according to claim 4, which comprises retracting the seatbelt, in the open passive position, into an electromagnetically screened region.

6. The method according to claim 5, which comprises retracting the seatbelt into a belt tensioner.

7. The method according to claim 1, which comprises implementing the method steps as an alternative to or in combination with at least one other method for determining occupancy of a seat, in which reflectors are arranged in and/or on a seat surface, a backrest and/or a headrest of the seat.

8. The method according to claim 1, which comprises implementing the method steps in combination with a method for access control and/or for starting the vehicle.

9. The method according to claim 8, which comprises implementing the method steps at intervals and/or after activation by a pre-crash sensor.

10. The method according to claim 8, which comprises implementing the method steps upon activation of an accident early warning system.

11. The method according to claim 1, which comprises triggering a comfort application in the vehicle with at least one result or output signal of the evaluating step.

12. The method according to claim 1, which comprises activating user-friendly operation in a passive access control and start system in a vehicle in response to at least one specific result and/or output signal of the evaluation step.

13. The method according to claim 12, which comprises releasing engine start functions and/or a steering wheel lock only if a driver's seat is detected as being occupied by an adult and a customer identification device is present in an interior of the vehicle, demonstrating access and start authorization in a contactless fashion.

14. The method according to claim 1, which comprises processing at least one result or output signal of the evaluation step as an information source for safety applications.

15. The method according to claim 1, which comprises processing at least one result or output signal of the evaluation step as an information source for an activation of an airbag system, a belt tensioner, and/or an adjustment of a headrest.

16. The method according to claim 1, wherein a group of the plurality of reflectors in a first one of the plurality of seats influences the high-frequency radiation that is emitted by the single transmitter differently than a group of the plurality of reflectors in a second one of the plurality of seats such that the high-frequency radiation reflected by the group of the plurality of reflectors in the first one of the plurality of seats is distinguishable from the high-frequency radiation reflected by the group of the plurality of reflectors in the second one of the plurality of seats.

17. A system for identifying seat occupancy in a vehicle with a plurality of seats to be monitored, comprising:
 a single transmitter configured to emit a field of high-frequency radiation towards each of the plurality of seats to be monitored;
 a plurality of reflector elements respectively disposed at the plurality of seats, said plurality of reflector elements, which are disposed at the plurality of the seats, configured to reflect the high-frequency radiation that is emitted by the single transmitter in dependence on an occupancy of the seats;
 a single receiver unit disposed to receive the high-frequency radiation that is reflected by said plurality of reflector elements which are disposed at the plurality of seats; and
 a control unit connected to said transmitter and to said receiver for activating a generation of the high-frequency wave field and/or for evaluating a radiation intensity received by said receiver unit in dependence on the occupancy of the seats.

18. The system according to claim 17, wherein said reflector elements are each assigned to a respective seat and said reflector elements are individually distinguishable from other reflectors assigned to other seats.

19. The system according to claim 17, wherein at least one reflector is disposed in or on a seatbelt associated with a respective seat.

20. The system according to claim 17, wherein said system is configured to implement the method according to claim 1.

21. The system according to claim 17, wherein a group of said plurality of reflector elements disposed at a first one of the plurality of seats influences the high-frequency radiation that is emitted by the single transmitter differently than a group of said plurality of reflector elements disposed at a second one of the plurality of seats such that the high-frequency radiation reflected by the group of said plurality of reflector elements disposed at the first one of the plurality of seats is distinguishable from the high-frequency radiation reflected by the group of said plurality of reflector elements disposed at the second one of the plurality of seats.

* * * * *